UNITED STATES PATENT OFFICE.

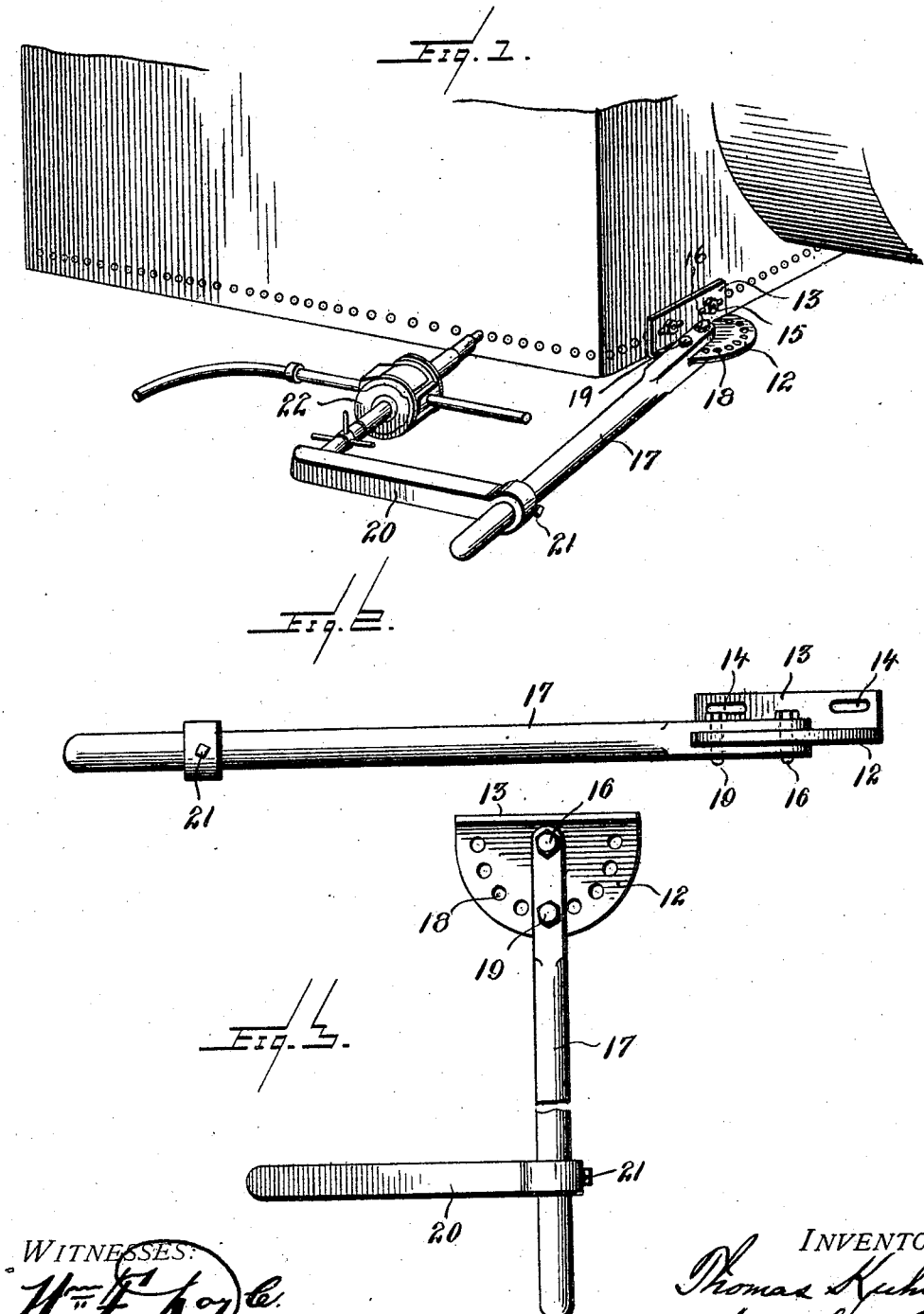

THOMAS KUHN, OF HORNELL, NEW YORK.

DRILL-BRACE.

No. 847,013.

Specification of Letters Patent.

Patented March 12, 1907.

Application filed October 8, 1906. Serial No. 337,970.

*To all whom it may concern:*

Be it known that I, THOMAS KUHN, a citizen of the United States, residing at Hornell, in the county of Steuben and State of New York, have invented or discovered certain new and useful Improvements in Drill-Braces, of which the following is a specification, reference being had therein to the accompanying drawings.

This invention has for its object to provide a drill-brace of such construction that it may be adjusted to and held at different angles, so that it may be convenient for use for some kinds of work for which the drill-braces heretofore in use were not adapted—as, for example, where it may be desired to reach around the corners of rectangular devices or articles to be drilled.

To this end the preferred form of the invention comprises a bracket having a horizontally-extending portion or platform and a vertical flange, said flange having holes or slots through which pass suitable bolts which rigidly hold the bracket in working position. To the horizontal portion or platform of the bracket is pivoted a swinging bar, and the said platform is provided near its curved edge with a series of holes for the reception of a holding-pin which passes through the said swinging bar and which serves to retain the said bar in any desired position of adjustment. The said swinging bar is provided with a right-angular arm which is preferably adjustably secured thereto by a set-screw and which arm serves as the bracing-arm for the drill.

In the accompanying drawings, Figure 1 is a perspective view illustrating the invention in connection with a drill which is in operative position. Fig. 2 is a detail side view of the invention; and Fig. 3, a detail plan view of the same, showing the swinging arm in a different position of adjustment relative to the holding-bracket from that represented in Fig. 2.

Referring to the drawings, the holding-bracket comprises a horizontally-extending portion or platform 12 and a vertical flange 13, said flange being provided with slots 14 for the reception of holding-bolts 15. The platform 12, which is preferably semicircular in form, is provided at its central inner part with a hole for the reception of a pin 16, which serves as a pivot for the swinging bar 17, and the said platform is provided near its outer edge with a series of holes or perforations 18 for the reception of a holding-pin 19. The bar 17 is bifurcated at its inner end to embrace the edge of the platform 12, as clearly shown in Figs. 1 and 2, and each arm of the bifurcated portion is provided with two holes, those in the upper arm registering with those in the lower. Of the pairs of holes thus formed in the bar 17 the inner pair are for the reception of the pin 16 and the outer pair for the pin 19, the pins 16 and 19 passing entirely through the platform 12 and through both arms of the bar 17. The said swinging bar 17 is provided near its outer or free end with a right-angular brace-arm 20, which is preferably adjustably secured thereto by a set-screw 21.

In the operation of the invention a drill, as 22, which may be of any well-known form, and which may be driven by compressed air or steam or operated by hand, is held by the brace-arm 20 in operative position, as indicated in Fig. 1, which represents the drill as being held in such a position as to drill out the mud-ring-attaching bolts of a locomotive fire-box on a face which is around the corner from the face to which the holding-bracket is secured. In such a case the swinging bar 17 would be located in a position relative to the holding-bracket similar to that represented in Fig. 2, while if it were desired to drill holes on that face of a rectangular object to which the holding-bracket was attached the swinging bar would occupy a position relative to the said holding-bracket like that represented in Fig. 3.

The holding-pin 19 is readily removable, so that it can be taken out when it is desired to swing the bar 17 to different positions, and the pivot-pin 16 is also preferably removable, so that the said bar 17 may be readily detached from the holding-bracket when desired. The construction shown obviates the use of clamp-screws and the like and provides a simple and reliable adjustable connection between the holding-bracket and the swinging bar, which may be very quickly adjusted and which holds the parts firmly in adjusted position. The holding-bracket 19 is preferably made of heavy boiler-iron cut out and bent into the shape shown, and the swinging bar 17 and brace-arm 20 may be made of any suitable metal, preferably iron or steel.

Having thus described my invention, I claim and desire to secure by Letters Patent—

A drill-brace consisting of the combination with a holding-bracket comprising a flange provided with slots for attaching bolts, and a semicircular platform having a series of holes near its curved edge, of a swinging bar having a bifurcated end embracing said platform and pivotally connected thereto, said bar being provided with registering openings in the arms of its bifurcated portion at a distance from its pivot to register with said holes in said platform, a removable pin adapted to pass through the openings in said bar and the holes in said platform and thereby retain said swinging bar in any position to which it may be swung or adjusted, and a rigid brace-arm adjustably carried by said arm.

In testimony whereof I affix my signature in presence of two witnesses.

THOMAS KUHN.

Witnesses:
JOHN McCRADY,
RALPH BUCKLEY WATSON.